(12) United States Patent
Svensson Landin (10) Patent No.: US 9,914,220 B2
(45) Date of Patent: Mar. 13, 2018

(54) WEB BROWSER ACCESS TO ROBOT CELL DEVICES

(71) Applicant: ABB Schweiz AG, Baden (CH)

(72) Inventor: Kjell Svensson Landin, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/108,716

(22) PCT Filed: Feb. 7, 2014

(86) PCT No.: PCT/EP2014/052391
§ 371 (c)(1),
(2) Date: Jun. 28, 2016

(87) PCT Pub. No.: WO2015/117662
PCT Pub. Date: Aug. 13, 2015

(65) Prior Publication Data
US 2016/0325435 A1    Nov. 10, 2016

(51) Int. Cl.
*G06F 15/173* (2006.01)
*B25J 9/16* (2006.01)
*H04L 29/06* (2006.01)

(52) U.S. Cl.
CPC ........ *B25J 9/1689* (2013.01); *H04L 63/0281* (2013.01); *H04L 63/08* (2013.01); *H04L 63/10* (2013.01); *G05B 2219/31241* (2013.01); *G05B 2219/40174* (2013.01)

(58) Field of Classification Search
CPC .... B25J 9/1689; H04L 63/0281; H04L 63/08; H04L 63/10; G05B 2219/31241; G05B 2219/40174
See application file for complete search history.

(56) References Cited

U.S. PATENT DOCUMENTS

| | | |
|---|---|---|
| 6,801,920 B1 | 10/2004 | Wischinski |
| 7,096,090 B1 | 8/2006 | Zweig |
| 2002/0152307 A1 | 10/2002 | Doyle et al. |

(Continued)

FOREIGN PATENT DOCUMENTS

WO    2012125474 A1    9/2012

OTHER PUBLICATIONS

Egevang et al, "The IP Network Address Translator (NAT)", May 1994, Network Working Group, p. 1-10.*

(Continued)

*Primary Examiner* — Ryan Jakovac
(74) *Attorney, Agent, or Firm* — Whitmyer IP Group LLC (57) ABSTRACT

A method and computer program product for controlling data transfer between a client device and auxiliary robot cell functions of a robot cell as well as to an interface arrangement for the robot cell. The arrangement includes a reverse proxy providing connectivity for a client device to auxiliary robot cell functions accessible via a local addressing space, where the reverse proxy receives, in a first message having a destination address belonging to the interface device and being a first global address in a global addressing space, a request intended for an auxiliary robot cell function, converts the first address to a first local address of the auxiliary robot cell function in the local addressing space and sends the request to a web server associated with the auxiliary robot cell function using the first local address.

15 Claims, 4 Drawing Sheets

(56) References Cited

U.S. PATENT DOCUMENTS

| | | |
|---|---|---|
| 2002/0161904 A1 | 10/2002 | Tredoux et al. |
| 2004/0010344 A1* | 1/2004 | Hiratsuka ............... B25J 9/1689 |
| | | 700/245 |
| 2006/0085839 A1 | 4/2006 | Brandt et al. |
| 2007/0088834 A1* | 4/2007 | Litovski .............. H04L 63/0272 |
| | | 709/227 |
| 2007/0150104 A1 | 6/2007 | Jang et al. |
| 2009/0262741 A1 | 10/2009 | Jungck et al. |
| 2012/0167041 A1* | 6/2012 | Payzer ................ G06F 21/6209 |
| | | 717/113 |
| 2012/0222101 A1 | 8/2012 | Iwasaki et al. |
| 2015/0020188 A1* | 1/2015 | Segal .................. H04L 63/0227 |
| | | 726/13 |

OTHER PUBLICATIONS

International Search Report and Written Opinion of the International Searching Authority Application No. PCT/EP2014/052391 Completed: Feb. 13, 2015; dated Feb. 20, 2015 8 pages.

\* cited by examiner

WEB BROWSER ACCESS TO ROBOT CELL DEVICES

TECHNICAL FIELD

The present invention relates to the field of robots. The invention more particularly relates to a method and computer program product for controlling data transfer between a client device (28) and auxiliary robot cell functions of a robot cell as well as to an interface arrangement for the robot cell.

BACKGROUND

Web browsers have become interesting to use in relation to industrial robots and robot cells. With a web browser a remote user may access a robot controller for a robot cell in an efficient and simple way. The user may then obtain data of the operation of the robot via a remote computer and the Internet.

However, there are today more devices than the robot controller in a cell, such as various types of monitoring devices like sensors, cameras, etc., which devices are used by the robot controller in controlling the operation in the cell.

In this field of endeavor U.S. Pat. No. 7,096,090 describes a web client being able to connect to a robotic CPU, via which it is further possible to access other devices associated with the robot using short range radio.

However, it may also be of interest for the user to access these auxiliary robot cell devices of the cell in a simple way using the same type of technology as that used for accessing the robot controller, for instance so that the web browser may communicate directly with the devices of the robot cell without having the robot controller to handle various types of communication conversions, which may be burdensome on the robot controller.

However, this access may also need to be controlled for a number of reasons.

The invention is thus directed towards providing web based connectivity to several devices of a robot cell.

SUMMARY

The present invention is directed towards providing web based connectivity to several devices of a robot cell using a single point of contact.

One object of the present invention is to provide a method for controlling data transfer between a client device and auxiliary robot cell functions of a robot cell.

This object is according to a first aspect of the present invention achieved through a method for controlling data transfer between a client device and auxiliary robot cell functions of a robot cell, the robot cell comprising at least one industrial robot being controlled by a robot controller, the method being performed by an interface device for the robot cell and comprising the steps of:
receiving a request intended for an auxiliary robot cell function, the request being received in a first message having a destination address belonging to the interface device, where the address belonging to the interface device is a first global address in a global addressing space,
converting the first global address to a first local address of the auxiliary robot cell function in a local addressing space provided for auxiliary robot cell functions of the cell, and
sending the request to a web server associated with the auxiliary robot cell function using the first local address.

Another object of the present invention is to provide an interface arrangement for a robot cell which controls data transfer between a client device and auxiliary robot cell functions of a robot cell.

This object is according to a second aspect of the present invention achieved through an interface arrangement for a robot cell, the robot cell comprising at least one industrial robot being controlled by a robot controller, the arrangement comprising
an interface device having a reverse proxy providing connectivity for a client device to auxiliary robot cell functions associated with the robot cell, where the auxiliary robot cell functions are accessible via a local addressing space of the cell, the reverse proxy being configured to
receive a request intended for an auxiliary robot cell function, the request being received in a first message having a destination address belonging to the interface device, said destination address being a first global address in a global addressing space,
convert the first global address to a first local address of the auxiliary robot cell function in the local addressing space, and
send the request to a web server associated with the auxiliary robot cell function using the first local address.

Another object of the present invention is to provide a computer program product for controlling data transfer between a client device and auxiliary robot cell functions of a robot cell.

This object is according to a third aspect of the present invention achieved through a computer program product for controlling data transfer between a client device and auxiliary robot cell functions of a robot cell, the robot cell comprising at least one industrial robot being controlled by a robot controller, the computer program product comprising a data carrier with computer program code which when run in an interface device, causes the interface device to
receive a request intended for an auxiliary robot cell function, said request being received in a first message having a destination address belonging to the interface device, said destination address being a first global address in a global addressing space,
converting the first global address to a first local address of the further function in a local addressing space provided for auxiliary robot cell functions of the cell, and
send the request to a web server (36) associated with the auxiliary robot cell function using the first local address.

The present invention has many advantages. It uses one global address for a robot cell and web servers for accessing auxiliary robot cell functions. This provides easily implemented access to auxiliary robot cell functions while keeping the number of global address low, which is advantageous since the number of such addresses is limited. The linking of the global address to a cell also provides a logical and better structured address use, since industrial robots are often based on the concept of the cell. The invention has the further advantage of allowing easier implementation of authorization, safety and security measures in the cell.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
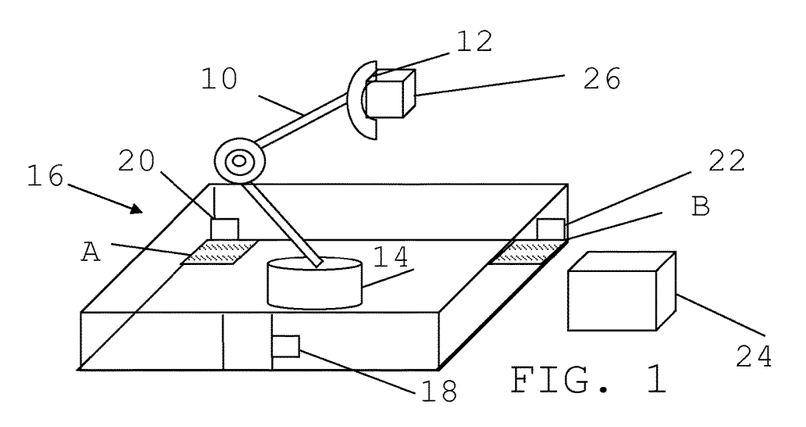
FIG. 1 schematically shows a robot cell with a robot together with an interface device and associated auxiliary robot cell devices.

FIG. 1 schematically shows a robot cell 16. The cell 16 comprises an area surrounded by a fence and in this area there is a robot 10 on a foundation 14, which robot 10 is equipped with a tool 12 for holding an object 26 which is a product or is used in the forming of a product. In the handling of the object 26, the robot 10 may be involved in a robot program where it takes the object 26 from a first location A using the tool 12, performs a number activities and then places the object 26 at a second location B. In variations of the invention, the tool 12 may also be equipped with a sensor for sensing a property of the object.

In or at the cell 16 there may be a number of further sensors. As an example there is a first sensor 18 at a door in the fence that is used for a human to enter the cell 16, there is a second sensor 20 at the first location A and there is a third sensor 22 at the second location B. One of the sensors, for instance the first sensor 18, may also comprise a camera, which may be controlled. The camera may for instance be controlled to zoom and rotate in order to cover various views and areas of the cell 16. These are just some examples of sensors that can be used. At the cell 16 there is also an interface device 24, which interface device 24 comprises a robot controller. The robot controller is in turn connected to the robot 10 for controlling its movements and activities.

The robot is the central or primary device of the robot cell and the operation of the robot is the central or primary activity of the robot cell and therefore the control of the robot performed by the robot controller is a primary robot cell function. The above described sensors are furthermore examples of auxiliary robot cell devices, i.e. devices in or associated with the robot cell 16 performing auxiliary robot cell functions. It should be realized that the robot cell 16 may comprise also other types of auxiliary robot cell devices such as various actuators for instance actuators involved in the feeding of the object into and out of the cell 16.

The robot 10 may, as was mentioned above, be involved in the production of a product. This means that the object 26 being picked up at the first location A may not be identical to what is placed at the second location B. The object 26 may have been joined with other objects or altered in other ways in order to provide a product that leaves the robot cell 16. However, the robot 10 will move in a robot program path according to a robot program, which path is here exemplified as going from the first location A to the second location B. This path may be carefully programmed and the operation of the robot may depend heavily on data provided by the various sensors and the operation of the actuators for its performance. The robot 10 may repeatedly perform such a robot program in a production cycle. There may also exist gaps in the operation when the robot is not involved in any production according to the robot program.

Furthermore, in order to simplify the understanding of the present invention, only one robot 10 in the cell is shown and will be described. It should however be realized that as an alternative there may be more than one robot in a cell. The robot program may then comprise the robot movement paths of all the robots in the cell.

Figure 2:
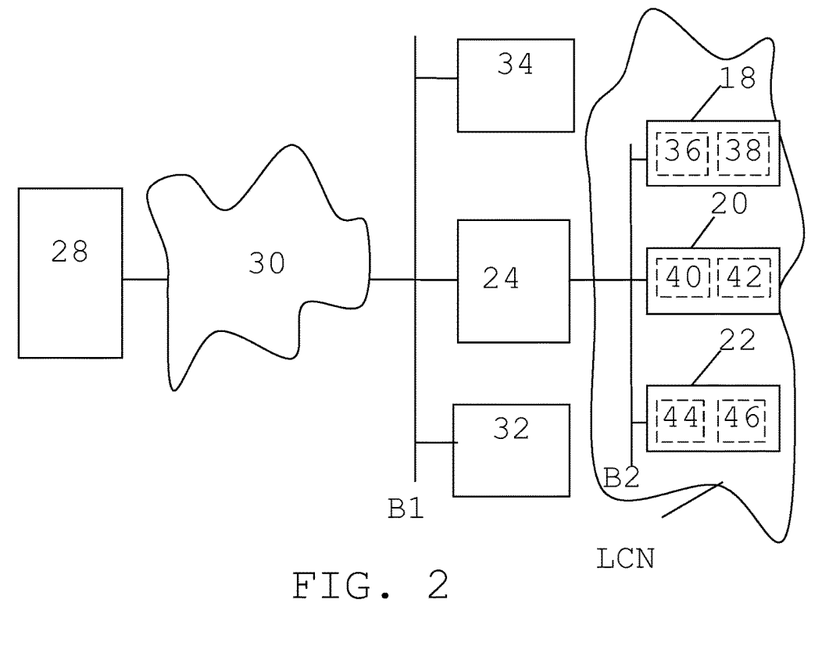
FIG. 2 shows a block schematic of the interface device communicating with a client device over a global network and connected to a local communication network leading to the auxiliary robot cell devices.

FIG. 2 schematically shows the interface device 24 being connected to a first data bus B1 as well as acting as an interface to a local communication network LCN comprising a second bus B2 to which the previously mentioned sensors 18, 20 and 22 are connected. In the figure the first sensor 18 comprises a first web server 36 and a first sensor function 38, the second sensor 20 comprises a second web server 40 and a second sensor function 42 and the third sensor 22 comprises a third web server 44 and a third sensor function 46. The sensors are thus auxiliary robot cell devices and the sensor functions are auxiliary robot cell functions.

The first data bus B1 and thereby also the interface device 24 is connected to a client device 28 via a global computer communication network 30, which global computer communication network 30 may be the Internet.

To the first bus B1 there is also connected a number of other interface devices 32 and 34, which may be of the same or similar type as the interface device 24. Each such interface device provides an interface to the functionality of a cell.

The communication network 30 may be a computer communication network, such as the Internet. The client device 28 may provide a user interface via which a user can provide and access data in relation to the robot cell 16. Because of this the client device 28 may be provided with a so-called web browser, such as Internet Explorer, Mozilla Firefox or Chrome (not shown).

The first bus B1 may be provided at an industrial production plant, for instance the plant of a car manufacturer, where each robot cell is concerned with performing some dedicated part of the production. Furthermore each interface device 24, 32, 34 may be directly accessed by other devices via the Internet, such as the client device 28. They may therefore be assigned permanent or temporary addresses in a global addressing space. However the devices 18, 20 and 22 associated with the cell 16 are all provided with addresses in a local addressing space dedicated to the local communication network LCN and therefore the auxiliary robot cell functions 38, 42 and 46 of the auxiliary robot cell devices 18, 20 and 22 may only be reached through contacting the corresponding web server 36, 40 and 44 using these local addresses. In the case of the auxiliary robot cell devices being sensors, the web servers 36, 40 and 44 are configured to deliver content from the sensor functions based on read requests sent by for instance web browsers or to configure the corresponding sensors for operation based on write requests, such as providing a sensor with operational settings to be used when performing sensor measurements.

Figure 3:
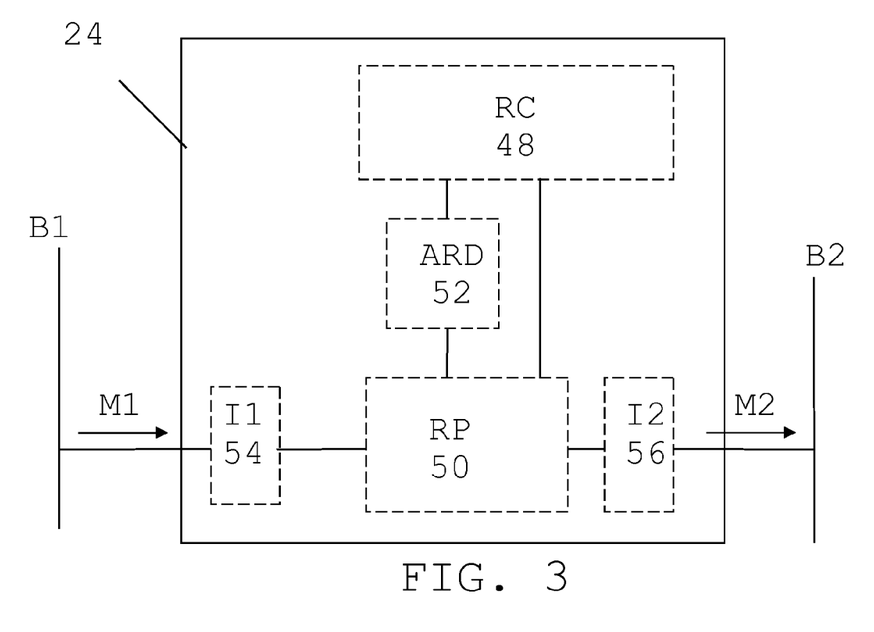
FIG. 3 shows a block schematic of relevant parts of a first variation of the interface device, FIG. 4 schematically shows a first message M1 being sent from the client device to the interface device, FIG. 5 schematically shows a second message M2 sent from the interface device to one of the auxiliary robot cell devices.

FIG. 3 shows a block schematic of some of the elements of the interface device 24. It comprises a first interface I1 54 for connection to the first bus B1 and second interface I2 56 for connection to the second bus B2. The interfaces 54 and 56 may be typical bus interfaces such as Ethernet bus interfaces. Between these interfaces there is a reverse proxy RP 50. The reverse proxy 50 is in turn connected to an access rights determining element ARD 52, which is also connected to the aforementioned robot controller RC 48. The robot controller 48 is also directly connected to the reverse proxy 50. As the robot controller 48 is used to control the robot 10 of the cell 16 it naturally also has a connection to the robot 10 shown in FIG. 1. However this connection is in the example given here a direct connection. It is in this case not a connection via the second bus B2. For this reason this connection has been omitted from the figure. Finally the figure shows how a first message M1 is received by the interface device 24 via the first interface 54 and a second message M2 is sent from the interface device 24 to the second bus B2 via the second interface 56.

Figure 4:
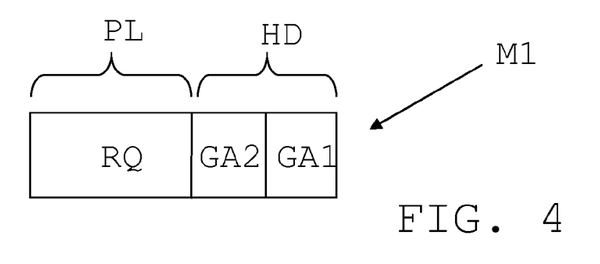

FIG. 4 schematically shows the structure of the first message M1. It comprises a header HD with a destination address and a source address, where the destination address in this case is a first global address GA1 which belongs to the interface device 24 and the source address is a second global address GA2, which in this case is the address of the client device 28. Both these addresses are typically implemented as Internet Protocol (IP) addresses and are furthermore addresses in a global addressing space, for global use via the Internet. The first message M1 also comprises a payload PL, which payload comprises a request RQ. Such a request can for instance be a read request or a write request.

Figure 5:
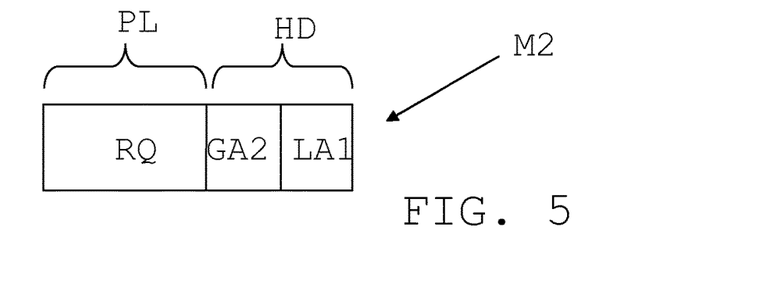

FIG. 5 schematically shows the second message M2. The second message M2 has the same structure as the first message with a header HD and a payload PL. The payload PL further comprises the same request RQ that was present in the first message. However the header HD differs. In this case the destination address is different. The destination address is an address in the local addressing space of the local communication network LCN. In this example the destination address is a first local address LA1, which is the address of the first sensor 18. It can also be seen that the source address is the same address GA2 that was used in the first message M1. However it is possible that the source address may differ. In some variations the source address may be the first global address of the interface device. If the interface device is provided with an address of the local addressing space, it is also possible that this local address is used as a source address in the second message.

Now that the various devices have been described, the general problems addressed by the invention will be described.

The communication network of a robot based industrial plant, such as an enterprise communication network comprising the first bus B1, may be big with a number of various plant devices connected to it, such as robot controllers as well as other devices, like control and surveillance computers, other sensors and transportation devices not directly linked to a robot or a robot cell. In short there may be several devices connected to the bus B1, each being assigned an own global address.

At the same time the interest of remote monitoring of the system has increased. It is therefore often desirable to use a remote computer, such as the client device 28, and connect to the communication network of the industrial plant in order to for instance monitor the functioning of plant devices. However it may also be of interest to provide program updates of various devices or new settings.

One very attractive way in which this may be done is through the use of the Internet. If the remote computer is equipped with a web browser and the plant devices are equipped with web servers, the remote computer may easily communicate with these plant devices that are connected to the plant communication network via the Internet. In FIG. 2 the client device 28 is an example of one such remote device and the interface devices 24, 32 and 34 are examples of such plant devices.

Each of the interface devices 24, 32 and 34 being connected to the first bus B1 may furthermore employ an own global address for being reached by the client device 28. In this way the client device can easily access the various devices connected to the bus B1.

Furthermore, the auxiliary robot cell devices of a robot cell are nowadays also often equipped with web servers, as indicated in FIG. 2. This enables the auxiliary robot cell functions to be reached by remote computers such as the client device 28.

However, there may be several such devices in a cell. If there are many cells and each auxiliary robot cell device is to receive a global address, the number of global addresses used in the communication network of the plant would increase radically. Global IP addresses are today a limited resource and it would for this reason be desirable to keep them down. However, it is of interest to keep the number of addresses down for other reasons. It may also be easier to locate a device if the global addresses are used in a more structured way.

According to one aspect of the invention, a global address is assigned to a robot cell. This means that all auxiliary robot cell devices, i.e. all devices in or associated with a cell and being accessed via a web server, may be accessed using this single global address. This type of address assignment is furthermore advantageous from a logical perspective, since all activities of industrial robots are typically linked to the cell. The cell is thus a suitable level in the plant hierarchy to assign a global address to.

In some variations of the invention, there is an interface arrangement comprising the interface device 24. The interface arrangement may in some cases only comprise the interface device. In other instances it may also comprise other devices of the cell, such as auxiliary robot cell devices accessible via a web server and the robot 10. This means that various sensors and actuators as well as the robot may also be a part of the interface arrangement. However, in all these variations the interface device comprises the reverse proxy 50, and this reverse proxy 50 is used to provide connectivity for the client device 28 to all devices of the cell, such as to the robot controller 48 and various sensors that are possible to reach with an address in the local addressing space of the local communication network LCN. Since the robot controller 48 is the entity that controls robot operations in the cell it may be desirable for the client device 28 to communicate frequently with this entity. For this reason it is advantageous if both the robot controller 48 and the reverse proxy 50 are provided together in the interface device 24. Through the use of a reverse proxy 50 it is furthermore possible to regulate the access to the various auxiliary robot cell devices and their functions, for instance in order to ensure that unauthorized entities are denied access. As will be seen later another reason for denying access is that robot operations may be jeopardized. The use of a reverse proxy in a robot cell may thus occur for a number of reasons.

Figure 6:
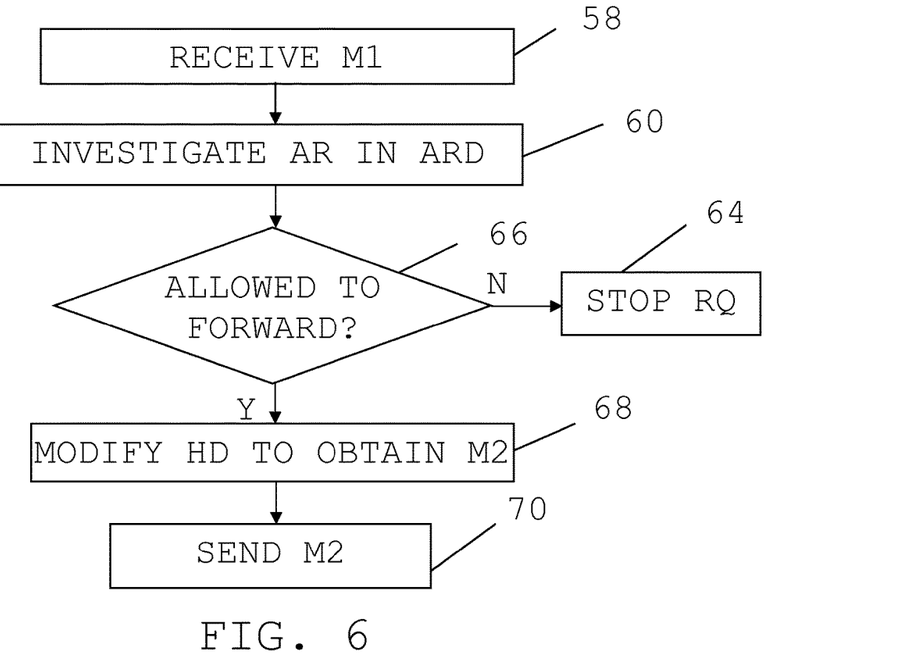
FIG. 6 shows a number of method steps being performed in a method for controlling data transfer between the client device and an auxiliary function, FIG. 7 schematically shows a number of method steps used in determining if access to an auxiliary function is to be given.

A first embodiment addressing at least some of the above mentioned concerns will now be described with reference also being made to FIG. 6, which shows a number of method steps being performed in a method for controlling data transfer between the client device 28 and an auxiliary robot cell function, where the method steps are being performed by the reverse proxy 50 and the access right determining element 52.

The method starts with a user of the client device 28 wanting to access an auxiliary robot cell function of the cell, which function may be performed by an auxiliary robot cell device, for instance the first sensor 18. The user may for instance want to change some settings of the sensor. In order to do this he or she may use the web browser of the client device 28 and connect to the interface device 24, where the contact may be set up with the aid of a Uniform Resource Locator (URL). The user may for instance employ an URL pointing at the interface device 24 and comprising an indication of the device to which contact is intended. The URL may then be of the following format:
GA1/robot1/sensor1:

This URL may thus comprise the first global address GA1 of the interface device 24, an indication of the robot cell robot1 and an indication of with which auxiliary robot cell device contact is wanted, here the first sensor 18 named sensor1.

It is possible that the first global address GA1 has been previously obtained by the client device 28 through the use of an URL pointing at the interface device 24. The client device 28 may therefore have found the first global address GA1 via a name lookup at a name server, such as a domain name server perhaps together with a use of an address allocation device, such as a Dynamic Host Configuration Protocol (DHCP) server.

A request RQ comprising data identifying activities that the user desires the auxiliary robot cell device to perform is then sent together with the URL in the first data message M1, where the destination address of this message M1 is the destination address of or belonging to the interface device 24, here the first global address GA1. The payload PL then comprises at least the name of the cell and the first sensor as well as the actual request RQ intended for the first sensor 18.

The first message M1 is then received by the reverse proxy 50 via the first interface 54, step 58. The reverse proxy 50 may then optionally forward the first message M1 or only the payload PL, to the access rights determining element 52, which then investigates the right to access the auxiliary robot cell function, step 60. The investigation may be an investigation concerning the rights of the user and/or the client device to access any device or function in the cell, which may be done through comparing user identities with allowable user identities or device identities such as Media Access Control (MAC) addresses with a list of allowable auxiliary robot cell device identities. A user investigation may be performed based on the user performing a login. The investigation may also or instead comprise a determination of access rights based on type of request. Some auxiliary robot cell devices may only be allowed to receive write requests from the client device 28, while others may only be allowed to receive read requests. The determination of the rights to access an auxiliary robot cell device based on type of request may furthermore be combined with an investigation of the current operational mode of the cell, for instance the investigation of whether or not a robot 10 in the cell is involved in running a robot program.

After having determined whether access is to be granted or not, the access rights determining element 52 forwards the result of the investigation to the reverse proxy 50. The result may be a decision to allow the request to be forwarded or to disallow the request from being forwarded to the auxiliary robot cell function 38.

In case the request is not allowed to be forwarded, step 66, the reverse proxy 50 then stops the request, step 64. This stopping may involve a permanent stopping like a discarding of the request RQ. It may also involve a temporary stopping, for instance through temporarily storing the request for being sent at a more suitable point in time. The request RQ is thus stopped from being forwarded to the first sensor 18. However, if the request is allowed to be forwarded step 66, the header HD of the message is modified in order to obtain the second message M2, step 68.

The modification may in this case involve changing the destination address to the address of the first sensor 18 in the local addressing space. The reverse proxy 50 may in this case investigate the auxiliary robot cell device identifier of the URL, which is here "sensor1" and locate a local address corresponding to this identifier, here the first local address LA1, which is the address of the first sensor 18. The modification may thus involve converting the first global address to a first local address. The changed message, which is the second message M2, thus comprises a new destination address but a payload PL with the same request RQ. This second message M2 is then sent to the first sensor 18 via the second bus B2, step 70. Optionally also the source address is changed to a source address of the interface device 24.

The second message M2 is then received by the web server 36 of the first sensor 18 and the content of the request RQ forwarded to the sensor function 38, which then acts on the content. The request RQ may for instance be a write request with new settings to be applied on the sensor 18. In this case these settings are forward to the sensor function 38, which then implements them. The request RQ may also be a read request, where the client device 28 asks for some sensor data, such as sensor measurements. In this case the sensor function 38 is informed of the desired data, which then fetches the data and may return it in one or more response messages. The one or more response messages generated by the first sensor 18 may then be addressed to the client device 28 using the second global address GA2 of the client device 28, if this is known. Alternatively an address of the interface device 24 may be used as a destination address, either the global address GA1 of this device 24 or a local address of this device in the local addressing space.

The response message is then received by the reverse proxy 50 of the interface device 24 via the second interface, which reverse proxy 50 then either directly sends the response to the client device 28 via the first interface 54 or performs an address translation of the destination address in order to send the response to the client device 28.

It can in this way be seen that the client device 28 is able to access the various devices of the cell using one global address for the whole cell, which reduces the number of required addresses at the industrial site as well as produces a logical use of such addresses based on robot cells which is easily understandable. It furthermore allows a number of security and safety measures to take place. It should here be realized that the client device 28 may also contact the robot controller 48. However, in this case the reverse proxy 50 acts as the web server of this robot controller 48.

Figure 7:
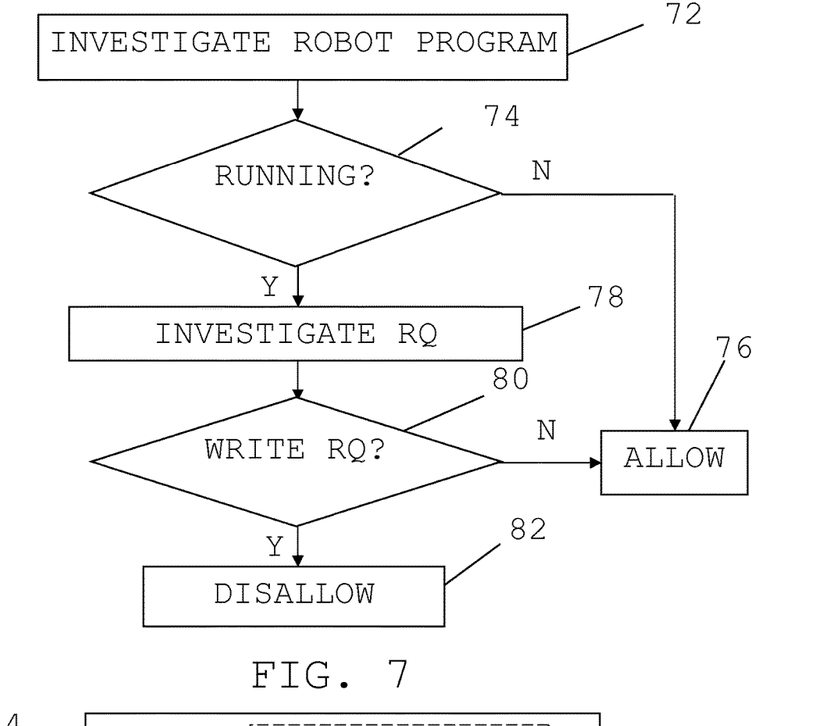

One security or safety measure that may be performed is closely related to the operation of the cell 16, which will now be described with reference being made to FIG. 7, which schematically shows a number of method steps used in determining if access to the auxiliary robot cell device is to be given or not, the method steps being performed by the access rights determining element 52.

As mentioned above the robots 10 of the cell 16 may be involved in running a robot program for instance for a production of a product like an automobile, where a robot program may be provided as a number of robot instructions in robot programming language.

It may as an example during the run of such a program be important that no changes are made to sensor settings because a change of these may disturb the production. A change of sensor settings during production may thus lead to the production of inferior or substandard products. A change may in fact even lead to a dangerous situation for personnel being located close to the cell 16. At the same time it may be unproblematic to provide read data such as measurement data during the production. There may therefore be a need for investigating the request in order to determine type and compare it with the operation of the robot 10 in the robot cell 16, such as if the robot 10 is involved in a robot program, and grant or deny access based on these investigations.

As the access rights determining element 52 receives the request RQ of the first message M1 it may therefore investigate if the robot 10 of the cell 16 is involved in a robot program, step 72. It may for this reason connect to the robot controller 48 and send a question to the robot controller 48 about what mode of operation the robot of the cell has and perhaps also about whether it is involved in a robot program or not.

The robot may be set to operate in a number of different modes, where the mode when it is running a robot program may be termed an Auto mode. Other modes comprise a Manual mode, which involves manual control of the robot. The robot may also be in "Motors on" or "Motors off" mode, where the "Motors on" mode involves the motors that actuate the robot being energized and the "Motors off" mode then means that the motors are not energized. Further modes involve that the program with robot instructions is running or stopped, or that the program is running but the robot is awaiting some kind of input. All these different modes may be investigated in the determining of whether a request is to be forwarded or not.

The robot controller 48 may respond with a yes or a no or with a response with the actual mode of operation. After having received the response to the status question, the access rights determining element 52 then knows how the request is to be handled. In case the robot 10 is not running a robot program, step 74, the reverse proxy 50 may be informed that the request RQ is allowed to be forwarded irrespective of what type it is, step 76. However, in case the robot 10 is involved in running a robot program, step 74, the request may be investigated, step 78, which investigation may be an investigation concerning type of request, for instance if it is a read request or a write request. If the type is a read request, i.e. not a write request, step 80, the reverse proxy 50 may be informed that the request is allowed to be forwarded, step 76. However, in case the request RQ is a write request, such as the provision of new settings, step 80, then the request forwarding may be disallowed, step 82. The reverse proxy 50 may in this case be informed that the request is to be stopped from being forwarded.

It can in this way be seen that the safety of the cell may be retained.

It should here be realized that as an alternative it is possible that the investigation of request type may be omitted. It is thus possible that all requests are disallowed if the robot 10 is involved in a robot program. It is also in a similar way possible to stop or delay read requests based on robot operation mode. The various investigations may furthermore differ from auxiliary robot cell device to auxiliary robot cell device.

A request being stopped in the above-described way is furthermore not necessarily discarded. It may instead be stored in a temporary memory. The access right determining element 52 may then repeatedly investigate the status of the robot cell 16. If it then finds out that the robot 10 is no longer involved in a vital activity such as running a robot program, then the stored request may be sent to the auxiliary robot cell device that the user wanted to contact.

Figure 8:
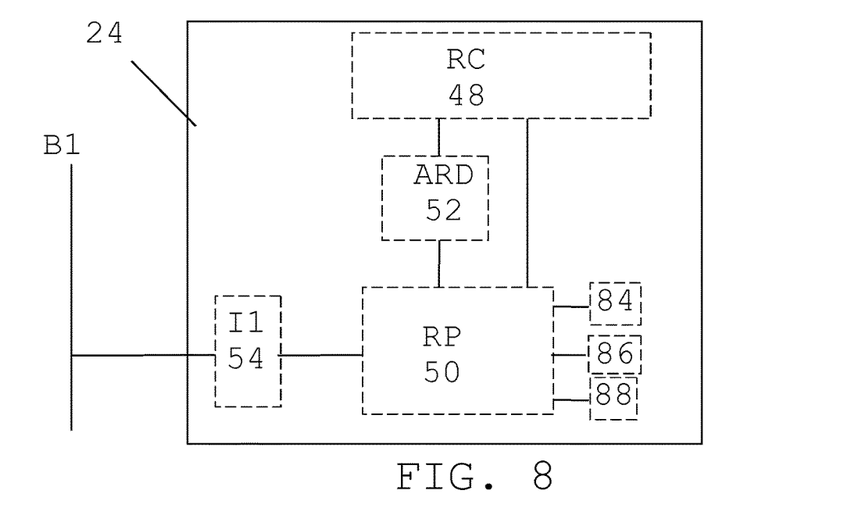
FIG. 8 shows a block schematic of relevant parts of a second variation of the interface device, and FIG. 9 schematically shows a computer program product in the form of a CD Rom disc comprising computer program code for performing the functionality of some of the interface device elements when being loaded into a processor.

In the robot cell example above each of the web servers of the sensors 18, 20 and 22 were provided in the sensors themselves. It is possible that the web servers associated with some auxiliary robot cell functions are provided in the interface device 24 instead. A variation of the interface device 24 where this is the case is depicted in FIG. 8, where all the web servers 84, 86 and 86 associated with corresponding auxiliary robot cell functions are provided in the interface device 24. In this case also the auxiliary robot cell functions may be provided in the interface device 24 (not shown).

As mentioned earlier, the web server of the robot controller 48 may with advantage be a part of the reverse proxy 50. As an alternative there may be a separate web server provided for the robot controller 48.

For this reason it should also be realized that the robot controller, with or without dedicated web server, may be provided as a separate device that may be accessed via the second bus B2.

Figure 9:
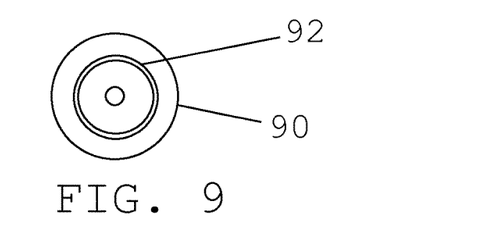

Furthermore the functionality of the reverse proxy and possibly also the access rights determining element may be provided in the form of one or more processors together with computer program memory including computer program code for performing their functions. As an alternative they may be provided in the form of one or more Application Specific Integrated Circuits (ASIC) or Field-Programmable Gate Arrays (FPGA). Such computer program code may also be provided on one or more data carriers which perform the functionality of the interface device when the program code thereon is being loaded in a computer forming the interface device 24. One such data carrier 90 with computer program code 92, in the form of a CD ROM disc, is schematically shown in FIG. 9. Such computer program may as an alternative be provided on a server and downloaded therefrom into the computer forming or being a part of the interface device While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method for controlling data transfer between a client device and auxiliary robot cell functions of a robot cell so that a user of the client device can access the auxiliary robot cell functions, the robot cell comprising at least one industrial robot being controlled by a robot controller, the method comprising the steps of:

receiving, from a web browser of the client device, a request intended for an auxiliary robot cell function, the request comprising data identifying activities that the user desires the auxiliary robot cell function to perform and being received in a first message having a destination address belonging to an interface device for the robot cell, the destination address being a first global Internet Protocol address in a global addressing space;

converting the first global Internet Protocol address to a first local address of the auxiliary robot cell function in a local addressing space provided for auxiliary robot cell functions of the robot cell;

sending, using the first local address, the request to a web server associated with the auxiliary robot cell function; and investigating if the robot is running a robot program producing a product, investigating whether the request is a request to write data to or a request to read data from the auxiliary robot cell function, and stopping the sending of the request to the web server associated with the auxiliary robot cell function if (i) the request is determined to be a request to write data to the auxiliary robot cell function, and (ii) the robot is determined to be running a robot program at a time of sending the request.

2. The method according to claim 1, further comprising investigating a right to access the auxiliary function in order to determine if the request is to be forwarded to the auxiliary robot cell function.

3. The method according to claim 1, wherein the method further comprises investigating a mode of operation of the robot.

4. The method according to claim 1, wherein the method further comprises investigating the request.

5. The method according to claim 1, wherein the stopping is a temporary stopping until the robot is no longer running a robot program.

6. An interface arrangement for a robot cell allowing a user of a client device to access auxiliary robot cell functions of the robot cell, said robot cell comprising at least one industrial robot being controlled by a robot controller, the arrangement comprising:

an interface device having a reverse proxy providing connectivity for the client device to auxiliary robot cell functions associated with the robot cell, where the auxiliary robot cell functions are accessible via a local addressing space of the robot cell, the reverse proxy being configured to:

receive, from a web browser of the client device, a request intended for an auxiliary robot cell function, said request comprising data identifying activities that the user desires the auxiliary robot cell function to perform and being received in a first message having a destination address belonging to the interface device, said destination address being a first global Internet Protocol address in a global addressing space;

convert the first global Internet Protocol address to a first local address of the auxiliary robot cell function in the local addressing space; and send, using the first local address, the request to a web server associated with the auxiliary robot cell function;

wherein the interface arrangement is further configured to investigate if the robot is running a robot program producing a product, investigate whether the request is a request to write data to or a request to read data from the auxiliary robot cell function, and stop the sending of the request to the web server associated with the auxiliary robot cell function if (i) the request is determined to be a request to write data to the auxiliary robot cell function, and (ii) the robot is determined to be running a robot program at a time of sending the request.

7. The interface arrangement according to claim 6, the interface device further comprising an access rights determining element configured to perform an access rights investigation in order to determine if the request is to be forwarded to the auxiliary robot cell function.

8. The interface arrangement according to claim 7, wherein the access rights determining element is further configured to connect to the robot controller for investigating a mode of operation of the robot.

9. The interface arrangement according to claim 6, wherein the interface arrangement is further configured to investigate the request.

10. The interface arrangement according to claim 6, wherein the stopping is a temporary stopping until the robot is no longer running a robot program.

11. The interface arrangement according to claim 6, further comprising the robot controller.

12. The interface arrangement according to claim 6, the interface device further comprising a web server of at least one auxiliary robot cell function.

13. The interface arrangement according to claim 6, wherein at least one auxiliary robot cell function is provided in an auxiliary robot cell device, said auxiliary robot cell device also comprising an associated web server and being connected to the interface device via a local communication network where the local addressing space is used.

14. The method according to claim 1, further comprising allowing a request to be forwarded to the web server associated with the auxiliary robot cell function if (i) the request is determined to be a request to read data, and (ii) the robot is determined to be running a robot program at a time of sending the request.

15. The interface arrangement according to claim 6, wherein the interface arrangement is further configured to allow a request to be forwarded to the web server associated with the auxiliary robot cell function if (i) the request is determined to be a request to read data, and (ii) the robot is determined to be running a robot program at a time of sending the request.

* * * * *